(12) United States Patent
Pustylnik et al.

(10) Patent No.: US 11,973,855 B2
(45) Date of Patent: Apr. 30, 2024

(54) PTP TRANSPARENT CLOCK WITH INTER-VLAN FORWARDING

(71) Applicant: Siemens Canada Limited, Oakville (CA)

(72) Inventors: Michael Pustylnik, Toronto (CA); Vignesh Shanmugan, Brampton (CA); Vivekanandan Umasuthan, Newmarket (CA)

(73) Assignee: Siemens Canada Limited, Ontario (CA)

( * ) Notice: Subject to any disclaimer, the term of this patent is extended or adjusted under 35 U.S.C. 154(b) by 332 days.

(21) Appl. No.: 17/411,970

(22) Filed: Aug. 25, 2021

(65) Prior Publication Data

US 2023/0060679 A1    Mar. 2, 2023

(51) Int. Cl.
| | | |
|---|---|---|
| *H04L 7/00* | (2006.01) | |
| *H04L 41/0803* | (2022.01) | |
| *H04L 49/354* | (2022.01) | |

(52) U.S. Cl.
CPC ........ *H04L 7/0008* (2013.01); *H04L 41/0803* (2013.01); *H04L 49/354* (2013.01)

(58) Field of Classification Search
CPC ... H04J 3/0667; H04J 3/0673; H04L 41/0803; H04L 45/66; H04L 45/74591; H04L 49/354; H04L 49/355; H04L 7/0008
See application file for complete search history.

(56) References Cited

U.S. PATENT DOCUMENTS

| | | | | |
|---|---|---|---|---|
| 6,430,621 | B1 * | 8/2002 | Srikanth | H04L 12/4645 709/227 |
| 7,701,951 | B2 * | 4/2010 | Chapman | H04L 47/70 370/401 |
| 8,135,771 | B2 * | 3/2012 | Lai | H04L 67/104 709/202 |
| 8,630,314 | B2 | 1/2014 | York | |
| 8,879,552 | B2 | 11/2014 | Zheng et al. | |
| 10,348,429 | B2 | 7/2019 | Galea et al. | |

(Continued)

FOREIGN PATENT DOCUMENTS

WO    2017130034    8/2017

OTHER PUBLICATIONS www.networkacademy.ioccnaehternetforwarding-data-between-vlans. downloaded Aug. 7, 2021, 3 pages.

(Continued)

*Primary Examiner* — Dung B Huynh

(57) ABSTRACT

There is described a Precision Time Protocol ("PTP") transparent clock for inter-VLAN forwarding comprising a Layer 2 switch and a PTP module. The switch includes a first port associated with a first VLAN and a second port associated with a second VLAN. The switch detects a PTP frame at the first port and the PTP module receives the PTP frame. The switch forwards the PTP frame to the second port in response to the PTP module determining that the PTP frame is a forwardable frame. For another embodiment, the switch includes a ternary content-addressable memory ("TCAM"), and the PTP module configures the TCAM to include forwarding rules. The Layer 2 switch forwards the PTP frame to the second port in response to identifying a particular forwarding rule associated with forwarding the PTP frame.

20 Claims, 5 Drawing Sheets

(56) References Cited

U.S. PATENT DOCUMENTS

| | | | | |
|---|---|---|---|---|
| 10,374,734 B1* | 8/2019 | Mallela | | H04J 3/0673 |
| 11,653,317 B2* | 5/2023 | Joseph | | H04J 3/0641 |
| | | | | 370/329 |
| 2006/0062187 A1* | 3/2006 | Rune | | H04L 63/1441 |
| | | | | 370/338 |
| 2008/0279181 A1* | 11/2008 | Shake | | H04L 45/24 |
| | | | | 370/389 |
| 2012/0327789 A1* | 12/2012 | Grenier | | H04L 43/10 |
| | | | | 370/252 |
| 2013/0024593 A1* | 1/2013 | Hauck | | H04N 21/43632 |
| | | | | 710/306 |
| 2013/0117621 A1* | 5/2013 | Saraiya | | H04L 49/70 |
| | | | | 714/E11.01 |
| 2013/0163618 A1* | 6/2013 | Sergeev | | H04J 3/0667 |
| | | | | 370/503 |
| 2014/0156867 A1* | 6/2014 | Davari | | H04L 45/60 |
| | | | | 709/238 |
| 2014/0177653 A1* | 6/2014 | Tzeng | | H04J 3/0673 |
| | | | | 370/503 |
| 2014/0254396 A1* | 9/2014 | Hilton | | H04L 45/00 |
| | | | | 370/250 |
| 2015/0015719 A1* | 1/2015 | Campana | | H04N 7/181 |
| | | | | 348/159 |
| 2015/0117471 A1* | 4/2015 | Mizrahi | | H04L 63/0485 |
| | | | | 370/512 |
| 2015/0207735 A1* | 7/2015 | Kuramoto | | H04L 45/742 |
| | | | | 370/392 |
| 2016/0073365 A1* | 3/2016 | Klockar | | H04J 3/0667 |
| | | | | 370/503 |
| 2017/0093677 A1* | 3/2017 | Skerry | | H04L 43/20 |
| 2017/0127368 A1* | 5/2017 | Wang | | G01S 19/14 |
| 2017/0245228 A1* | 8/2017 | Ruffini | | H04L 12/2801 |
| 2017/0288802 A1* | 10/2017 | Qiao | | H04L 9/40 |
| 2017/0302392 A1* | 10/2017 | Farra | | H04J 14/021 |
| 2017/0346765 A1* | 11/2017 | Immidi | | H04L 45/302 |
| 2018/0083873 A1* | 3/2018 | Seino | | H04L 49/30 |
| 2018/0109441 A1* | 4/2018 | Meyer | | H04J 3/0667 |
| 2019/0007344 A1* | 1/2019 | Mangin | | H04L 47/6275 |
| 2019/0089615 A1* | 3/2019 | Branscomb | | H04L 43/028 |
| 2019/0116111 A1* | 4/2019 | Izard | | H04L 45/745 |
| 2019/0138047 A1* | 5/2019 | El Kolli | | G06F 1/12 |
| 2019/0207862 A1* | 7/2019 | Kajio | | H04L 67/02 |
| 2019/0386763 A1* | 12/2019 | Rentschler | | H04J 3/0688 |
| 2020/0021532 A1* | 1/2020 | Borikar | | H04L 47/28 |
| 2020/0228220 A1* | 7/2020 | Joseph | | H04J 3/0697 |
| 2020/0267673 A1* | 8/2020 | Joseph | | H04L 69/28 |
| 2020/0329441 A1 | 10/2020 | Ha et al. | | |
| 2021/0028876 A1 | 1/2021 | Beardsley et al. | | |
| 2021/0029036 A1* | 1/2021 | Ghanwani | | H04L 12/4641 |
| 2021/0050988 A1* | 2/2021 | Fong | | H04L 49/354 |
| 2021/0152267 A1* | 5/2021 | Chan | | H04L 51/23 |
| 2021/0153148 A1* | 5/2021 | Joseph | | H04W 56/001 |
| 2021/0204007 A1* | 7/2021 | Xiong | | H04N 21/234 |
| 2021/0266085 A1* | 8/2021 | Evans | | H04J 3/0667 |
| 2021/0288738 A1* | 9/2021 | Byagowi | | H05K 7/1491 |
| 2021/0306262 A1* | 9/2021 | Shmatko | | H04L 45/586 |
| 2021/0328697 A1* | 10/2021 | Budnik | | H04L 12/40013 |
| 2021/0359778 A1* | 11/2021 | Wang | | H04W 76/12 |
| 2022/0029723 A1* | 1/2022 | Wang | | H04J 3/0667 |
| 2022/0069973 A1* | 3/2022 | Lau | | H04L 7/0054 |
| 2022/0114440 A1* | 4/2022 | Dong | | H04L 43/0852 |
| 2022/0140930 A1* | 5/2022 | Mehmedagic | | H04L 43/087 |
| | | | | 370/503 |
| 2022/0217505 A1* | 7/2022 | Fan | | H04L 5/00 |
| 2022/0263821 A1* | 8/2022 | Sharma | | H04L 12/4641 |
| 2023/0006807 A1* | 1/2023 | Hubbe | | G06F 9/45558 |
| 2023/0037476 A1* | 2/2023 | Katzri | | H04L 43/16 |
| 2023/0052252 A1* | 2/2023 | Katzri | | H04L 69/22 |
| 2023/0065686 A1* | 3/2023 | Umasuthan | | H04J 3/0667 |
| 2023/0259157 A1* | 8/2023 | Tano | | H04L 7/00 |
| | | | | 713/400 |
| 2023/0319743 A1* | 10/2023 | Joseph | | H04J 3/0641 |
| | | | | 370/329 |

OTHER PUBLICATIONS www.ccnablog.cominter-vlan-routing, downloaded Aug. 7, 2021, 9 pages.

* cited by examiner

PTP TRANSPARENT CLOCK WITH INTER-VLAN FORWARDING

FIELD OF THE INVENTION

This application relates to the field of Precision Time Protocol-capable networking devices and, more particularly, to a PTP transparent clock for forwarding Precision Time Protocol messages between virtual local area networks.

BACKGROUND

Components of a network may synchronize their clocks by a time synchronization protocol in order to promote operational efficiency. Examples of time synchronization protocols include the Simple Network Time Protocol, the Network Time Protocol, and the Precision Time Protocol ("PTP"). PTP, in particular, is a highly-accurate synchronization mechanism of the IEEE 1588 standard that is utilized for certain industrial/commercial control, measurement, and automation applications. Examples of such applications include energy control and generation, manufacturing, banking transaction, testing measurement and control, and robotic control systems.

PTP is a packet-based time synchronization protocol that describes the mechanism of how to distribute time over a packet-based network. The PTP uses the Best Master Clock Algorithm ("BMCA") that runs locally on each port of a networking device continuously to compute the PTP State (Master/Slave) of each participating port and help PTP devices discover the best master clock to receive the time. In this manner, PTP devices utilize the PTP to determine the synchronization Master-Slave hierarchy automatically.

The PTP defines PTP-capable networking devices including a Boundary Clock ("BC") and a Transparent Clock ("TC"). The TC is a simple and thus cost-effective device which generally does not generate or terminate PTP messages, does not participate in the BMCA, and simply forwards PTP messages to other network segments, only adding information about the time taken by the forwarding process. The BC is a more sophisticated and thus more expensive device, which acts as a PTP "proxy" when interconnecting network segments. The BC participates in the BMCA, has local time synchronization circuitry included in the hardware design, synchronizes its local time from PTP messages received from the network segment where the PTP master resides, and acts as a PTP master towards other network segments.

A virtual local area network ("VLAN") is a collection of devices or network nodes that communicate with one another as if they are connected to the same bus or hub, although physically they are connected to one or several LAN segments. In a technical sense, a segment is separated from the rest of the LAN by a bridge, router, or switch, and is typically used for a particular department. When a workstation broadcasts packets, they reach all other workstations on the VLAN but none outside of it.

In many applications, PTP is intended to span the whole LAN regardless of its segmentation by VLAN's. This could be achieved by allocating a dedicated VLAN for PTP which spans the whole LAN or having PTP networking devices which would forward PTP messages between VLAN's. A dedicated VLAN for PTP spanning the whole LAN is not preferred because network administration would be more complicated. Thus, PTP networking devices which forward PTP messages between VLAN's is preferred. As stated above, a BC acts as a proxy between the network segments it interconnects and, therefore, it is able to forward PTP messages between VLAN's. However, due to the higher cost of a BC, using BC's as Layer 2 networking devices is not a cost-effective approach for building a LAN.

Although the PTP standard does not explicitly define forwarding rules for the TC, the de facto standard behavior of such devices is applying forwarding rules of a Layer 2 switch, as standardized in IEEE 802.1D/Q. As a Layer 2 switch never forwards packets between VLAN's, the TC as defined by the IEEE standard is not capable of forwarding PTP messages between VLAN's. Thus, it is difficult to design a LAN with PTP synchronization throughout that is cost effective.

SUMMARY

In accordance with one embodiment of the disclosure, there is provided a Transparent Clock ("TC") approach for inter-VLAN forwarding of Precision Time Protocol ("PTP") messages. The TC is a simple device that measures resident time spent passing through a switch, adds the resident time to a correction field of a PTP message, and forwards PTP messages to other network segments. Layer 2 switch forwarding rules enable PTP messages to be forwarded between VLAN's.

One aspect is a Precision Time Protocol ("PTP") transparent clock for inter-VLAN forwarding comprising a Layer 2 switch and a PTP module communicating with the Layer 2 switch. The Layer 2 switch includes a first port associated with a first VLAN and a second port associated with a second VLAN, in which the second VLAN is different from the first VLAN. The Layer 2 switch detects a PTP frame at the first port and the PTP modules receives the PTP frame from the Layer 2 switch in response to detecting the PTP frame at the first port. The PTP module determines whether the PTP frame is a forwardable frame. The Layer 2 switch forwards the PTP frame to the second port in response to the PTP module determining that the PTP frame is a forwardable frame.

Another aspect is a method of a PTP transparent clock for inter-VLAN forwarding. A PTP frame is detected at a first port of a Layer 2 switch, in which the first port is associated with a first VLAN. The PTP frame is received at a PTP module in response to detecting the PTP frame at the first port. The PTP module determines whether the PTP frame is a forwardable frame. The PTP frame is forwarded to a second port of the Layer 2 switch in response to determining that the PTP frame is a forwardable frame, in which the second port is associated with a second VLAN different from the first VLAN.

Yet another aspect is a PTP transparent clock for inter-VLAN forwarding comprising a Layer 2 switch including a ternary content-addressable memory ("TCAM") and a PTP module communicating with the Layer 2 switch. The Layer 2 switch also includes a first port associated with a first VLAN and a second port associated with a second VLAN, in which the second VLAN is different from the first VLAN. The PTP module configures forwarding rules of the TCAM of the Layer 2 switch. The Layer 2 switch detects a PTP frame at the first port and identifies a particular forwarding rule of the forwarding rules of the TCAM associated with forwarding the PTP frame to the second port of the Layer 2 switch. The Layer 2 switch forwards the PTP frame to the second port of the Layer 2 switch in response to identifying the particular forwarding rule of the TCAM.

Still another aspect is a method of a PTP transparent clock for inter-VLAN forwarding. Forwarding rules of a Ternary Content-Addressable Memory ("TCAM") of a Layer 2 switch are configured by a PTP module. A PTP frame is detected at a first port of the Layer 2 switch, in which the first port is associated with a first VLAN. The Layer 2 switch identifies a particular forwarding rule of the forwarding rules of the TCAM associated with forwarding the PTP frame to a second port of the Layer 2 switch, in which the second port is associated with a second VLAN different from the first VLAN. The PTP frame is forwarded to the second port of the Layer 2 switch in response to identifying the particular forwarding rule of the TCAM.

The above described features and advantages, as well as others, will become more readily apparent to those of ordinary skill in the art by reference to the following detailed description and accompanying drawings. While it would be desirable to provide one or more of these or other advantageous features, the teachings disclosed herein extend to those embodiments which fall within the scope of the appended claims, regardless of whether they accomplish one or more of the above-mentioned advantages.

BRIEF DESCRIPTION OF THE DRAWINGS

For a more complete understanding of the present disclosure, and the advantages thereof, reference is now made to the following descriptions taken in conjunction with the accompanying drawings, wherein like numbers designate like objects.

DETAILED DESCRIPTION

Figure 1:
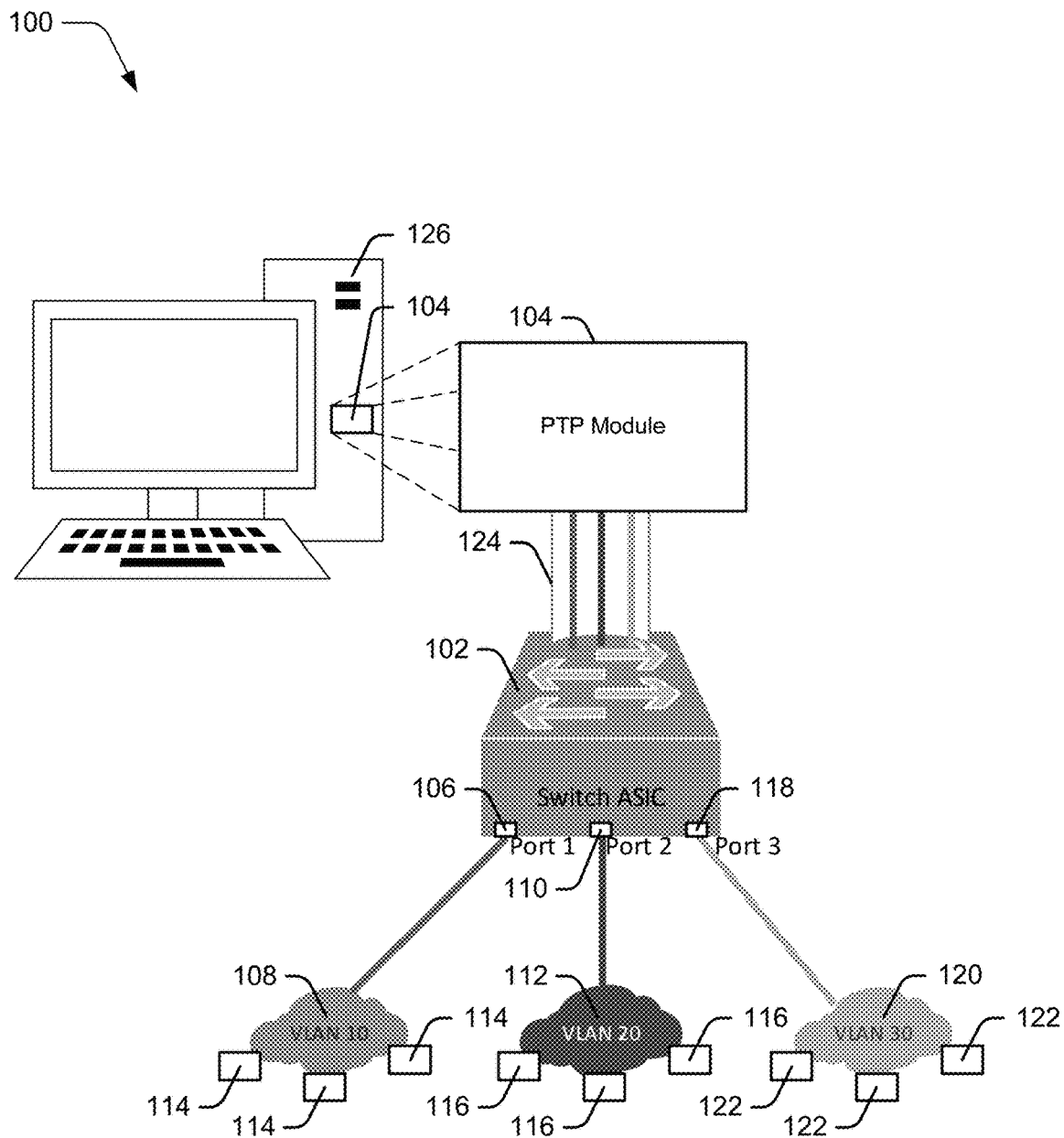
FIG. 1 is a schematic diagram of an example implementation of a PTP transparent clock that is operable to employ techniques described herein.

Various technologies that pertain to systems and methods that facilitate inter-VLAN forwarding of Precision Time Protocol ("PTP") messages by a Transparent Clock ("TC") will now be described with reference to the drawings, where like reference numerals represent like elements throughout. The drawings discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged apparatus. It is to be understood that functionality that is described as being carried out by certain system elements may be performed by multiple elements. Similarly, for instance, an element may be configured to perform functionality that is described as being carried out by multiple elements. The numerous innovative teachings of the present application will be described with reference to exemplary non-limiting embodiments.

The PTP transparent clock extends and configures a standard Layer 2 switch to include forwarding rules so that the PTP transparent clock may forward PTP messages between VLAN's. Configurations of the PTP transparent clock include module controlled forwarding and switch controlled forwarding.

Referring to FIG. 1, there is shown a schematic diagram of an example implementation of module controlled forwarding for a PTP transparent clock 100. For inter-VLAN forwarding, a system 100 of Precision Time Protocol ("PTP") transparent clock includes a Layer 2 switch 102 and a PTP module 104. The Layer 2 switch 102 is a PTP-compliant networking switch having multiple layers, adopted from the Open System Interconnect ("OSI") model, including a physical layer ("Layer 1") providing hardware time stamping and a data link layer ("Layer 2)" providing latency and other timing management based on the hardware time stamping. For example, the Layer 2 switch may modify the PTP message to include a timestamp of time spent traversing the Layer 2 switch. For some embodiments, the Layer 2 switch 102 is an application specific integrated circuit ("ASIC").

The transparent clock includes the Layer 2 switch 102 and does not forward PTP messages between VLAN's without the PTP module 104. The Layer 2 switch 102 by itself does not perform any type of operation associated with layers higher than Layer 2, such as a routing function associated with Layer 3. In contrast to a Layer 2 switch 102, a Layer 3 switch, which is not within the scope of this disclosure, is a PTP-compliant networking switch that can perform routing functions in addition to switching.

The Layer 2 switch 102 includes a first port 106 associated with a first virtual local area network ("VLAN") 108 and a second port 110 associated with a second VLAN 112, in which the second VLAN is different from the first VLAN. The first VLAN 108 includes a first collection of devices or network nodes 114 that are connected and communicate with one another within the first VLAN, and the second VLAN 112 includes a second collection of devices or network nodes 116 that are connected and communicate with one another within the second VLAN. For some embodiments, the Layer 2 switch 102 may include other ports in addition to the first and second ports 106, 110. For example, the Layer 2 switch forwards the PTP frame to a third port 118 associated with a third VLAN 120, in which the third VLAN is different from the first and second VLAN 108, 112. Similar to the first and second VLAN's 108, 112, the third VLAN 120 includes a third collection of devices or network nodes 122 that are connected and communicate with one another within the third VLAN.

In order to forward PTP frames between VLAN's, the Layer 2 switch 102 includes a capability of trapping PTP frames and forwarding them to the PTP module 104 for processing. Also, the PTP module 104 includes a capability to analyze and forward the PTP frames based on pre-configured rules out of specific ports on specific VLAN's. The PTP module 104 communicates with the Layer 2 switch 102 via a software and/or hardware link 124. For example, the PTP module 104 and at least a portion of the Layer 2 switch 102 may reside in a single processor or multiple processors.

As stated above, the transparent clock includes the Layer 2 switch 102 and is not a router and, thus, does not have the capability to forward packets, including PTP messages, between VLAN's without the PTP module 104. In contrast to a switch which forwards packets in hardware, the coordination of the Layer 2 switch 102 and the PTP module 104 traps PTP messages to the PTP module and may cause forwarding by a configurable unit, which includes software, to provide full flexibility for the forwarding rules.

The PTP module 104 provides this capability to the Layer 2 switch 102 by receiving a PTP frame from the Layer 2 switch and determining whether the PTP frame is a forwardable frame. The PTP module 104 may determine whether the PTP frame is a forwardable frame based on a frame type or other identifying data associated with the PTP frame. For one embodiment, the PTP module 104 determines that the PTP frame is a forwardable frame by identifying the PTP frame as a PTP announce frame. For another embodiment, the PTP module 104 determines that the PTP frame is a forwardable frame by identifying the PTP frame as a PTP sync frame. For yet another embodiment, the PTP module 104 determines that the PTP frame is a forwardable frame by identifying the PTP frame as a PTP follow-up frame. IEEE 1588 specification specifies information about the PTP announce frame, the PTP sync frame, and the PTP follow-up frame, and is hereby incorporated by reference for this particular purpose. In general, the announce messages used by the best master clock algorithm to determine a clock hierarchy and a grandmaster, and the sync and follow-up frames include time information used to synchronize clocks of networking devices across the network.

For some embodiments, the PTP module 104 is, or is part of, a processing unit or device 126 communicating with the Layer 2 switch 102. For these embodiments, the processing unit or device 126 receives the PTP frame from the Layer 2 switch 102, determines whether the PTP frame is a forwardable frame, and provides information to the Layer 2 switch to forward the PTP frame from the first port 106 to one or more other ports, such as the second port 110 and/or the third port 118. Operating in conjunction with the PTP module 104, the Layer 2 switch 102 detects the PTP frame at the first port 106 associated with the first VLAN 108 and forwards the PTP frame to another port 110, 118 corresponding to a different VLAN 112, 120 in response to the PTP module determining that the PTP frame is a forwardable frame. For some embodiments, the Layer 2 switch 102 forwards the PTP frame to multiple ports, such as the second and third ports 110, 118, in response to the PTP module 104 determining that the PTP frame is a forwardable frame.

Figure 2:
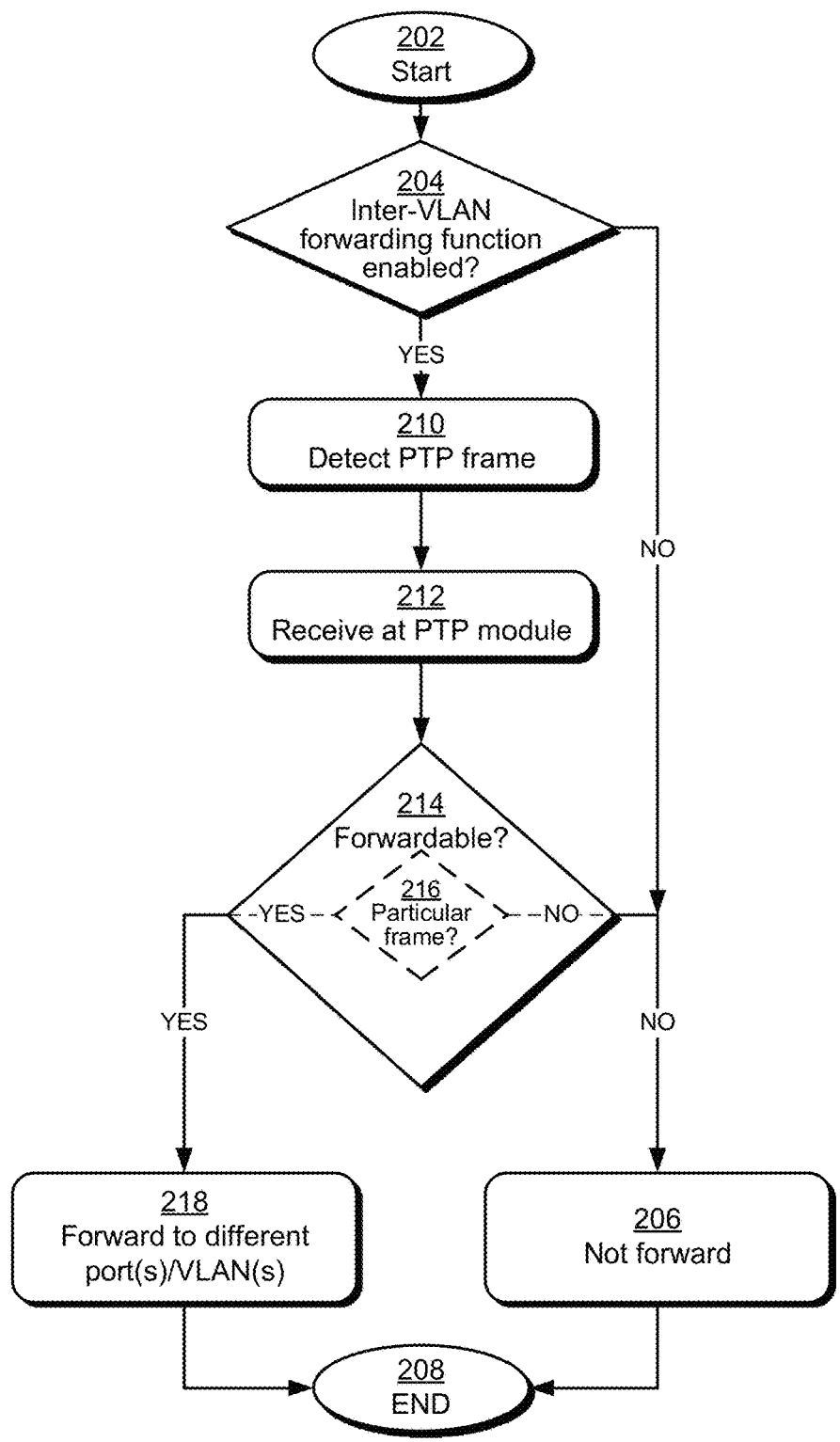
FIG. 2 is a flow diagram depicting an example implementation of an operation of the PTP transparent clock of FIG. 1.

Referring to FIG. 2, there is shown a flow diagram depicting an example implementation of an operation 200 of the PTP transparent clock 100. Upon activation (202), the PTP transparent clock 100 determines whether an inter-VLAN forwarding function has been enabled (204). If the system 100 determines that the inter-VLAN forwarding function has not been enabled (204), then the inter-VLAN forwarding of the PTP frame does not occur (206) and the operation ends (208). It should be noted that, even if the inter-VLAN forwarding function is not enabled (204), frames may still be forwarded between ports that are within the same VLAN. On the other hand, if the system 100 determines that the inter-VLAN forwarding function is enabled, then the Layer 2 switch 102 proceeds with detecting (210) a PTP frame at the first port 106 of the Layer 2 switch in which the first port is associated with the first VLAN 108 and its nodes 114. For some embodiments, the Layer 2 switch 102 is an application specific integrated circuit ("ASIC"), and the Layer 2 switch is capable of modifying the PTP message to include a timestamp of time spent traversing the Layer 2 switch. The PTP module 104 receives (212) the PTP frame from the Layer 2 switch 102 in response to detecting the PTP frame at the first port 106.

In response to receiving (212) the PTP frame at the PTP module 104, the PTP module determines (214) whether the PTP frame is a forwardable frame. For example, the PTP module 104 may determine that the PTP frame is a forwardable frame by identifying (216) that the PTP frame as a PTP announce frame, a PTP sync frame, or a PTP follow-up frame. If the PTP module 104 determines (214) that the PTP frame is not a forwardable frame, then the inter-VLAN forwarding of the PTP frame does not occur (206) and the operation ends (208). On the other hand, if the PTP module 104 determines (214) that the PTP frame is a forwardable frame then, in response, the PTP module 104 proceeds with causing the Layer 2 switch 102 to forward (218) the PTP frame to the second port 110 of the Layer 2 switch. For some embodiments, in addition to forwarding (218) the PTP frame to the second port, the Layer 2 switch may also forward the PTP frame to one or more other ports, such as the third port 118.

Figure 3:
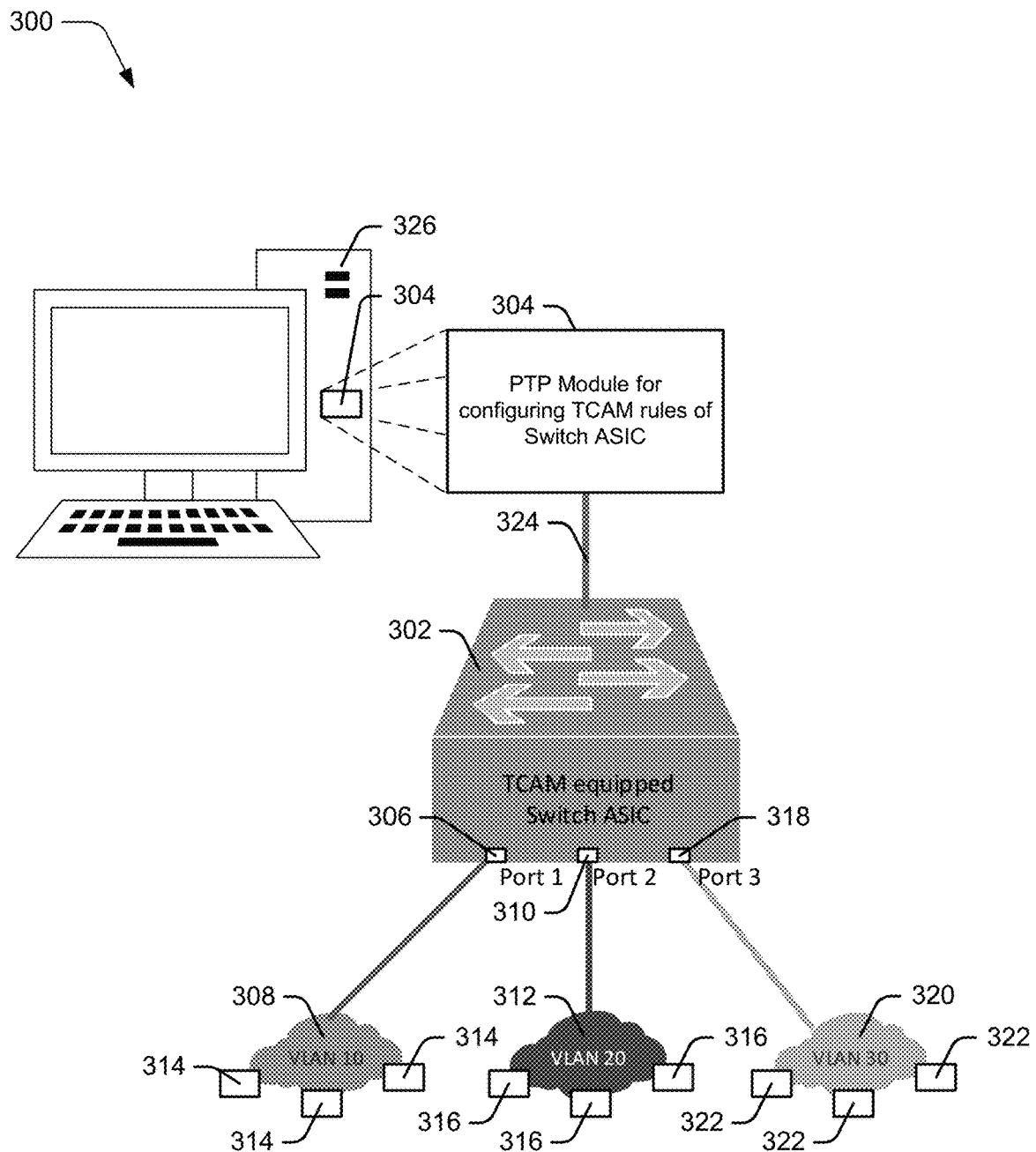
FIG. 3 is a schematic diagram of an example implementation of another PTP transparent clock that is operable to employ techniques described herein.

Referring to FIG. 3, there is shown a schematic diagram of an example implementation of a PTP transparent clock using switch controlled inter-VLAN forwarding. For this switch controlled inter-VLAN forwarding, the Layer 2 switch 302 is implemented to utilize a hardware part, such as a switch ASIC, explicitly designed for forwarding Layer 2 frames between its ports. The Layer 2 switch 302 includes a memory component, namely a Ternary Content-Addressable Memory ("TCAM"), that allows configuration and storage of custom forwarding rules. The TCAM allows the ASIC user to create custom filter, manipulate, and egress rules for Layer 2 frames. The PTP module 304 is capable of communicating with the Layer 2 switch 302 and configuring the TCAM rules in the Layer 2 switch to forward PTP frames between VLANs.

Subsequent to configuring the inter-VLAN forwarding rules of the TCAM of the Layer 2 switch 302 by the PTP module 304, the PTP frame arrives at the first port 306 of the Layer 2 switch which is associated with the first VLAN 308. The Layer 2 switch 102 also includes a second port 310 associated with a second VLAN 112, which is different from the first VLAN 308. The first VLAN 308 includes a first collection of devices or network nodes 314, and the second VLAN 312 includes a second collection of devices or network nodes 316. For some embodiments, the Layer 2 switch 102 may include a third port 118 associated with a third VLAN 320 and a third collection of devices or network nodes 322. The PTP module 304 communicates with the Layer 2 switch 102 via a wired or wireless link 324. For some embodiments, the PTP module 104 is, or is part of, a processing unit or device 326 communicating with the Layer 2 switch 102.

The Layer 2 switch 302 analyzes the PTP frame received at the first port 306 and examines the TCAM rules of the Layer 2 switch. In particular, the Layer 2 switch 302 determines whether there is a TCAM rule that is applicable to the received PTP frame. The Layer 2 switch 302 proceeds to forward the PTP frame according to the TCAM rule in response to determining that the TCAM rules is applicable to the PTP frame. For example, the Layer 2 switch 302 may identify a particular forwarding rule associated with forwarding the PTP frame to the second port 310 of the Layer 2 switch, and the Layer 2 switch may forward the PTP frame in response to identifying the particular forwarding rule.

Figure 4:
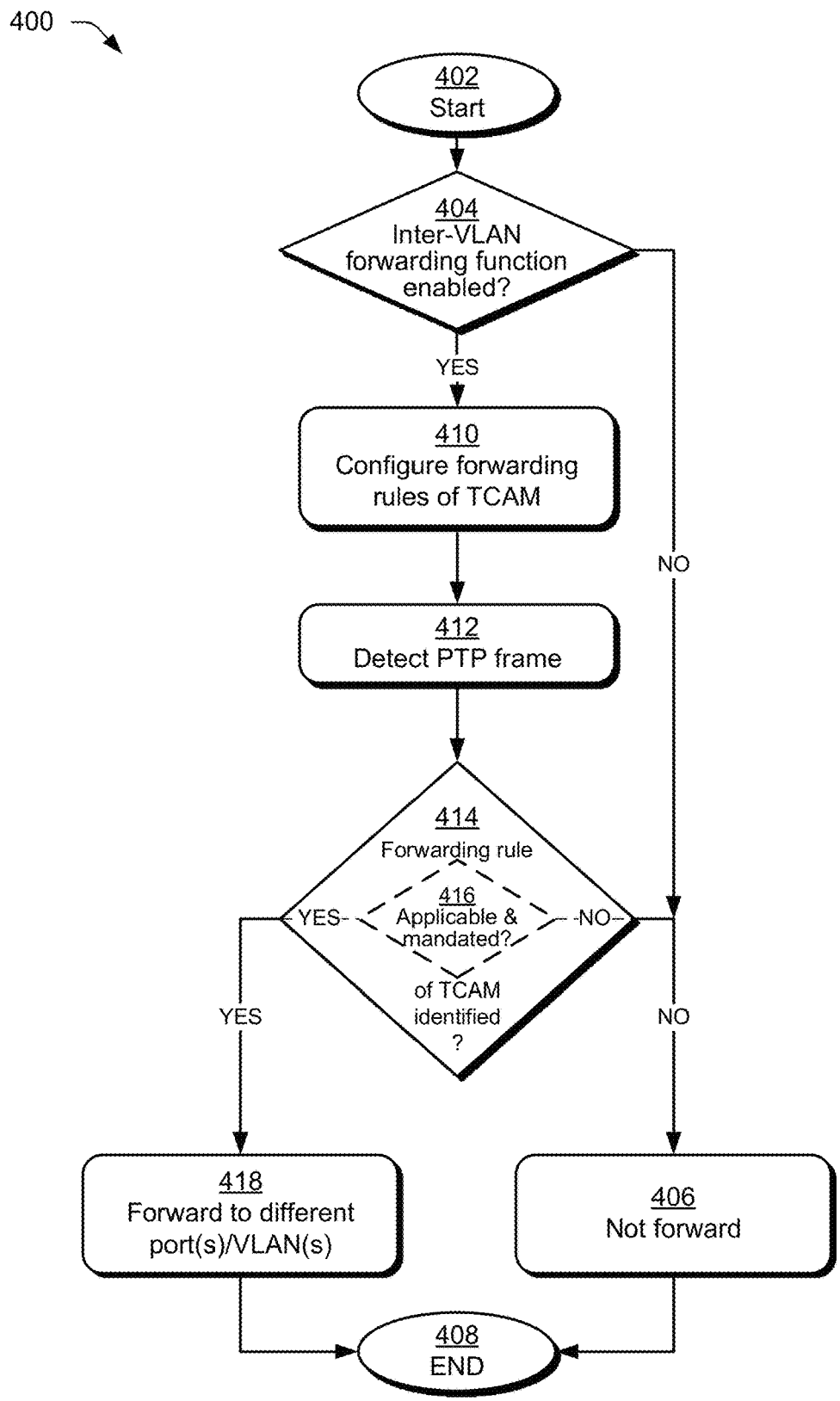
FIG. 4 is a flow diagram depicting an example implementation of an operation of the PTP transparent clock of FIG. 3.

Referring to FIG. 4, there is shown a flow diagram depicting an example implementation of an operation 400 of the PTP transparent clock 100. Upon activation (402), the PTP transparent clock 100 determines (404) whether an inter-VLAN forwarding function has been enabled. If not, then the inter-VLAN forwarding of the PTP frame does not occur (406) and the operation ends (408). Otherwise, if the system 100 determines (404) that the inter-VLAN forwarding function is enabled, then the PTP module 304 proceeds with configuring (410) forwarding rules of a Ternary Content-Addressable Memory ("TCAM") of the Layer 2 switch 302.

Subsequent to configuring (410) the forwarding rules of the TCAM, the Layer 2 switch 302 detects (412) a PTP frame at the first port 306 of the Layer 2 switch. The Layer 2 switch 302 identifies (414) a particular forwarding rule of the TCAM associated with forwarding the PTP frame to the second port 310 of the Layer 2 switch in response to detecting the PTP frame at the first port 306. For example, the Layer 2 switch 302 determines whether the particular forwarding rule is applicable (416) to the PTP frame and mandates the forwarding of the PTP frame to the second port 310 of the Layer 2 switch. If not, then the inter-VLAN forwarding of the PTP frame does not occur (406) and the operation ends (408). On the other hand, if the Layer 2 switch 302 identifies (414) the particular forwarding rule of the TCAM then, in response, the Layer 2 switch proceeds with forwarding (418) the PTP frame to the second port 310 of the Layer 2 switch. For some embodiments, in addition to forwarding (418) the PTP frame to the second port 310, the Layer 2 switch may also forward the PTP frame to one or more other ports, such as the third port 318.

Figure 5:
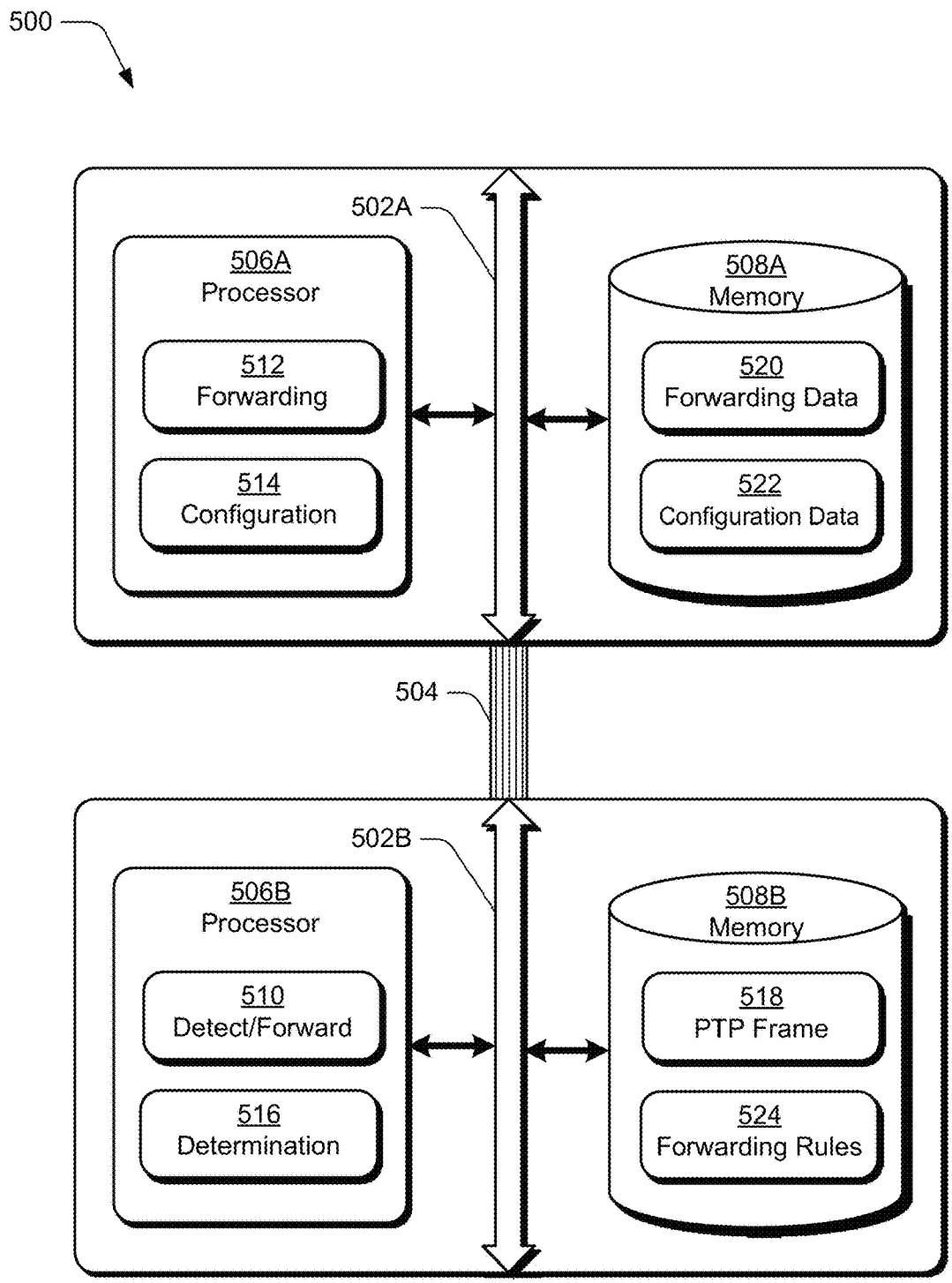
FIG. 5 is a block diagram depicting an example implementation of device components of the PTP transparent clock of FIG. 1 and/or FIG. 3.

FIG. 5 represents example device components 500 of individual devices of PTP transparent clock, such as the PTP module and the Layer 2 switch. The device components 500 of each device comprises a communication bus 502A, 502B for interconnecting other device components directly or indirectly. Also, as stated above, The devices communicate with each other via a wired or wireless link 504. The other device components include one or more processors 506A, 506B, and one or more memory components 508A, 508B.

The processor or processors 506A, 506B may execute code and process data received from other components of the device components 500, such as information stored at the memory component 508A, 508B. The code associated with the transparent clock and stored by the memory component 508A, 508B may include, but is not limited to, operating systems, applications, modules, drivers, and the like. An operating system includes executable code that controls basic functions of the transparent clock, such as interactions among the various components of the device components 500 and storage and retrieval of code and data to and from the memory component 508A, 508B.

Each application includes executable code to provide specific functionality for the processor 506A, 506B and/or remaining components of the transparent clock. For example, for some embodiments, the applications may include, but are not limited to, a detect/forward module 510 executable by the processor 506B of the Layer 2 switch to detect a PTP frame at one port and forward the PTP frame to another port and a forwarding module 512 executable by the processor 506A of the PTP module to determine whether the PTP frame is a forwardable frame. For some embodiments, the applications may include, but are not limited to, a configuration module 514 executable by the processor 506A of the PTP module to configure forwarding rules of TCAM of the Layer 2 switch and a determination module 516 executable by the processor 506B of the Layer 2 switch to identify a particular forwarding rule of the TCAM associated with forwarding the PTP frame to another port.

Data stored at the memory component 508A, 508B is information that may be referenced and/or manipulated by an operating system or application for performing functions of the transparent clock. For example, for some embodiments, the data may include, but are not limited to, PTP frame data 518 of a memory component 508B of the Layer 2 switch to store one or more PTP frames captured by the Layer 2 switch and forwarding data 520 of a memory component 508A of the PTP module to store information about forwardable frames, such as a PTP announce frame, a PTP sync frame, and/or a PTP follow-up frame. For some embodiments, the applications may include, but are not limited to, configuration data 522 of the memory component 508A of the PTP module to configure as the forwarding rules of TCAM of the Layer 2 switch and forwarding rules 524 of the memory component 508B of the Layer 2 switch to provide rules of the TCAM associated with forwarding the PTP frame to another port.

It is to be understood that FIG. 5 is provided for illustrative purposes only to represent examples of the device components 500 of a transparent clock 100 and is not intended to be a complete diagram of the various components that may be utilized by the system. Therefore, the transparent clock 100 may include various other components not shown in FIG. 5, may include a combination of two or more components, or a division of a particular component into two or more separate components, and still be within the scope of the present invention.

Those skilled in the art will recognize that, for simplicity and clarity, the full structure and operation of all data processing systems suitable for use with the present disclosure are not being depicted or described herein. Also, none of the various features or processes described herein should be considered essential to any or all embodiments, except as described herein. Various features may be omitted or duplicated in various embodiments. Various processes described may be omitted, repeated, performed sequentially, concurrently, or in a different order. Various features and processes described herein can be combined in still other embodiments as may be described in the claims.

It is important to note that while the disclosure includes a description in the context of a fully functional system, those skilled in the art will appreciate that at least portions of the mechanism of the present disclosure are capable of being distributed in the form of instructions contained within a machine-usable, computer-usable, or computer-readable medium in any of a variety of forms, and that the present disclosure applies equally regardless of the particular type of instruction or signal bearing medium or storage medium utilized to actually carry out the distribution. Examples of machine usable/readable or computer usable/readable mediums include: nonvolatile, hard-coded type mediums such as read only memories (ROMs) or erasable, electrically programmable read only memories (EEPROMs), and user-recordable type mediums such as floppy disks, hard disk drives and compact disk read only memories (CD-ROMs) or digital versatile disks (DVDs).

Although an example embodiment of the present disclosure has been described in detail, those skilled in the art will understand that various changes, substitutions, variations, and improvements disclosed herein may be made without departing from the spirit and scope of the disclosure in its broadest form.

What is claimed is:

1. A Precision Time Protocol ("PTP") transparent clock for inter-VLAN forwarding comprising:
 a Layer 2 switch being a networking switch through which PTP frames traverse, the Layer 2 switch comprising a physical layer and a data link layer, the Layer 2 switch for switching PTP frames between ports of the Layer 2 switch, the Layer 2 switch including a first port associated with a first VLAN and a second port associated with a second VLAN, the second VLAN being different from the first VLAN, the Layer 2 switch detecting a PTP frame at the first port; and a PTP module communicating with the Layer 2 switch, the PTP module receiving the PTP frame from the Layer 2 switch in response to the Layer 2 switch detecting the PTP frame at the first port and determining whether the PTP frame is a forwardable frame, wherein the Layer 2 switch modifies the PTP frame to include a timestamp of time spent traversing the Layer 2 switch and forwards the PTP frame to the second port in response to the PTP module determining that the PTP frame is a forwardable frame.

2. The PTP transparent clock as described in claim 1, wherein the Layer 2 switch is an application specific integrated circuit.

3. The PTP transparent clock as described in claim 1, wherein the PTP module determines that the PTP frame is a forwardable frame by identifying the PTP frame as a PTP announce frame, a PTP sync frame, or a PTP follow-up frame.

4. The PTP transparent clock as described in claim 1, wherein the PTP module determines that an inter-VLAN forwarding function has been enabled.

5. The PTP transparent clock as described in claim 1, wherein the Layer 2 switch forwards the PTP frame to a third port in response to the PTP module determining that the PTP frame is a forwardable frame, the third port being associated with a third VLAN different from the first VLAN and the second VLAN.

6. A method of a Precision Time Protocol ("PTP") transparent clock for inter-VLAN forwarding, the method comprising:

detecting a PTP frame at a first port of a Layer 2 switch, the first port being associated with a first VLAN and the Layer 2 switch being a networking switch through which PTP frames traverse, the Layer 2 switch comprising a physical layer and a data link layer, the Layer 2 switch for switching the PTP frames between ports of the Layer 2 switch;

receiving the PTP frame at a PTP module in response to detecting the PTP frame at the first port;

determining at the PTP module that the PTP frame is a forwardable frame;

modifying the PTP frame at the Layer 2 switch to include a timestamp of time spent traversing the Layer 2 switch; and forwarding the PTP frame to a second port of the Layer 2 switch in response to determining that the PTP frame is a forwardable frame, the second port being associated with a second VLAN different from the first VLAN.

7. The method as described in claim 6, wherein the Layer 2 switch is an application specific integrated circuit.

8. The method as described in claim 6, wherein determining that the PTP frame is a forwardable frame includes identifying the PTP frame as a PTP announce frame, a PTP sync frame, or a PTP follow-up frame.

9. The method as described in claim 6, further comprising determining that an inter-VLAN forwarding function has been enabled.

10. The method as described in claim 6, wherein forwarding the PTP frame to the second port associated with the second VLAN includes forwarding the PTP frame to a third port, the third port being associated with a third VLAN different from the first VLAN and the second VLAN.

11. A Precision Time Protocol ("PTP") transparent clock for inter-VLAN forwarding comprising:

a Layer 2 switch being a networking switch through which PTP frames traverse, the Layer 2 switch comprising a physical layer and a data link layer, the Layer 2 switch for switching the PTP frames between ports of the Layer 2 switch, the Layer 2 switch including a ternary content-addressable memory ("TCAM"), a first port associated with a first VLAN, and a second port associated with a second VLAN, the second VLAN being different from the first VLAN, the Layer 2 switch detecting a PTP frame at the first port; and a PTP module communicating with the Layer 2 switch, the PTP module configuring a plurality of forwarding rules of the TCAM of the Layer 2 switch, wherein the Layer 2 switch identifies a particular forwarding rule of the plurality of forwarding rules of the TCAM associated with forwarding the PTP frame to the second port of the Layer 2 switch, modifies the PTP frame to include a timestamp of time spent traversing the Layer 2 switch, and the Layer 2 switch forwards the PTP frame to the second port of the Layer 2 switch in response to identifying the particular forwarding rule of the TCAM.

12. The PTP transparent clock as described in claim 11, wherein the Layer 2 switch is an application specific integrated circuit.

13. The PTP transparent clock as described in claim 11, wherein the Layer 2 switch identifies the particular forwarding rule by determining whether the particular forwarding rule is applicable to the PTP frame and mandates the forwarding of the PTP frame to the second port of the Layer 2 switch.

14. The PTP transparent clock as described in claim 11, wherein the Layer 2 switch determines that an inter-VLAN forwarding function has been enabled.

15. The PTP transparent clock as described in claim 11, wherein the Layer 2 switch forwards the PTP frame to a third port in response to identifying the particular forwarding rule of the TCAM, the third port being associated with a third VLAN different from the first VLAN and the second VLAN.

16. A method of a Precision Time Protocol ("PTP") transparent clock for inter-VLAN forwarding, the method comprising:

configuring, by a PTP module, a plurality of forwarding rules of a Ternary Content-Addressable Memory ("TCAM") of a Layer 2 switch;

detecting a PTP frame at a first port of the Layer 2 switch, the first port being associated with a first VLAN and the Layer 2 switch being a networking switch through which PTP frames traverse, the Layer 2 switch comprising a physical layer and a data link layer, the Layer 2 switch for switching the PTP frames between ports of the Layer 2 switch;

identifying, at the Layer 2 switch, a particular forwarding rule of the plurality of forwarding rules of the TCAM associated with forwarding the PTP frame to a second port of the Layer 2 switch, the second port being associated with a second VLAN different from the first VLAN;

modifying the PTP frame at the Layer 2 switch to include a timestamp of time spent traversing the Layer 2 switch; and forwarding the PTP frame to the second port of the Layer 2 switch in response to identifying the particular forwarding rule of the TCAM.

17. The method as described in claim 16, wherein the Layer 2 switch is an application specific integrated circuit of a hierarchical master-slave architecture for clock distribution.

18. The method as described in claim 16, wherein identifying the particular forwarding rule includes determining whether the particular forwarding rule is applicable to the PTP frame and mandates the forwarding of the PTP frame to the second port of the Layer 2 switch.

19. The method as described in claim 16, further comprising determining that an inter-VLAN forwarding function has been enabled.

20. The method as described in claim 16, wherein forwarding the PTP frame to the second port associated with the second VLAN includes forwarding the PTP frame to a third port in response to identifying the particular forwarding rule of the TCAM, the third port being associated with a third VLAN different from the first VLAN and the second VLAN.

* * * * *